(12) United States Patent
Seibold

(10) Patent No.: US 6,209,955 B1
(45) Date of Patent: Apr. 3, 2001

(54) VEHICLE SEAT WITH A YIELDING RECLINER STOP

(75) Inventor: Kurt A. Seibold, Dearborn Heights, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/176,187

(22) Filed: Oct. 21, 1998

(51) Int. Cl.[7] ........................................................ B60N 2/42
(52) U.S. Cl. ................................ 297/216.13; 297/378.12; 297/367
(58) Field of Search ........................... 297/216.1, 216.13, 297/216.4, 378.1, 378.12, 368, 367

(56) References Cited

U.S. PATENT DOCUMENTS

| | | | |
|---|---|---|---|
| 5,265,937 | * | 11/1993 | Allen . |
| 5,318,341 | * | 6/1994 | Griswold et al. . |
| 5,346,281 | * | 9/1994 | Hughes . |
| 5,366,268 | * | 11/1994 | Miller et al. . |
| 5,507,553 | | 4/1996 | Nishizawa . |
| 5,676,421 | | 10/1997 | Brodsky . |
| 5,697,670 | * | 12/1997 | Husted et al. . |
| 5,722,722 | | 3/1998 | Massara . |
| 5,733,008 | * | 3/1998 | Tame . |
| 5,842,744 | * | 12/1998 | Harmon . |
| 5,873,630 | * | 2/1999 | Yoshida et al. . |
| 5,882,080 | * | 3/1999 | Houghtaling et al. . |
| 5,884,972 | * | 3/1999 | Deptolla . |

* cited by examiner

Primary Examiner—Milton Nelson, Jr.
(74) Attorney, Agent, or Firm—Foley & Lardner

(57) ABSTRACT

A yielding recliner for a vehicle seat assembly in which a shoulder belt is attached to the seat back. The recliner yields in a controlled fashion during a front vehicle impact to absorb energy while allowing the seat back to rotate forward a limited degree. A stop limits the extent of forward rotation of the seat back and limits the load which is applied to the recliner.

23 Claims, 5 Drawing Sheets

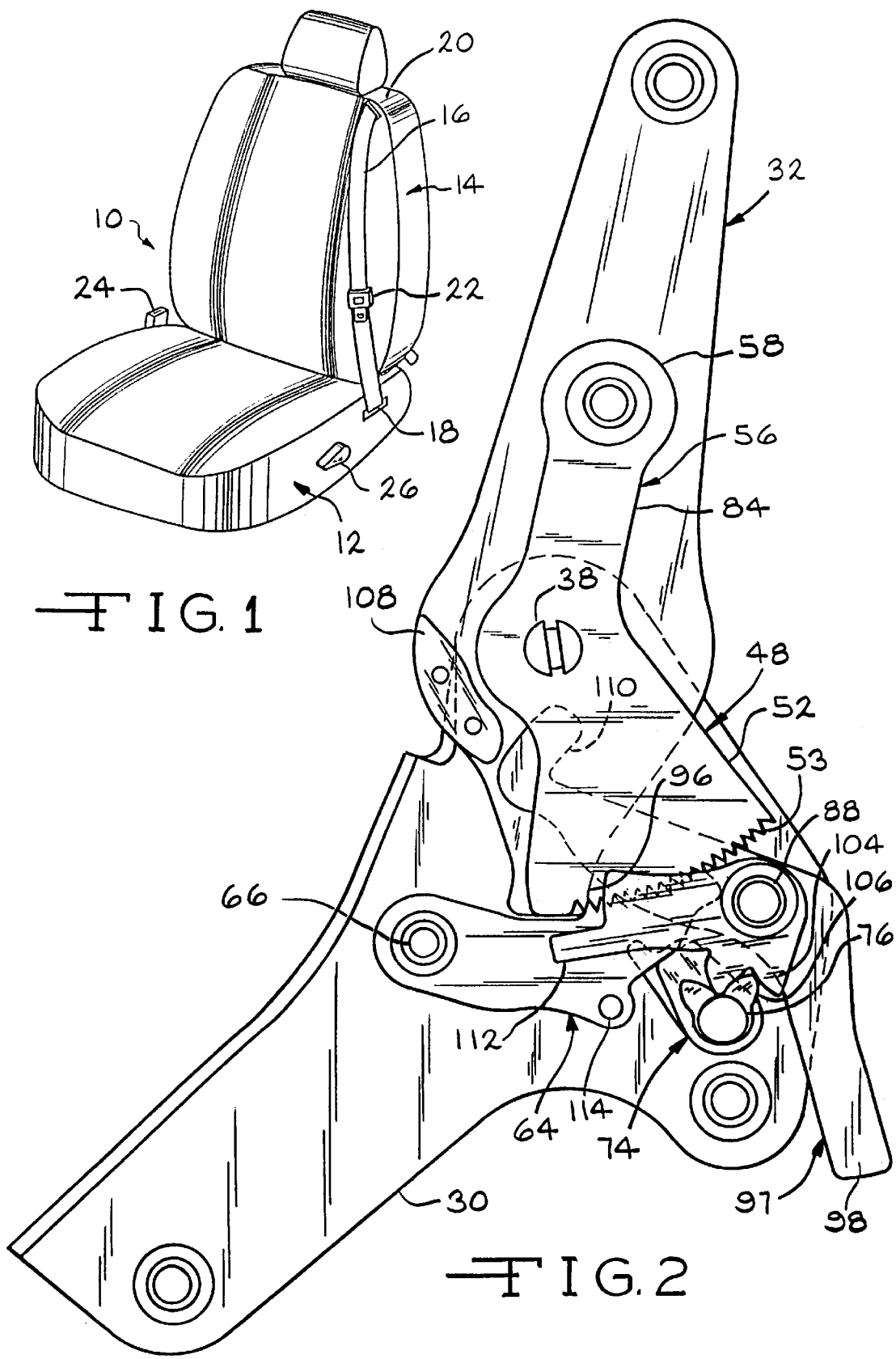

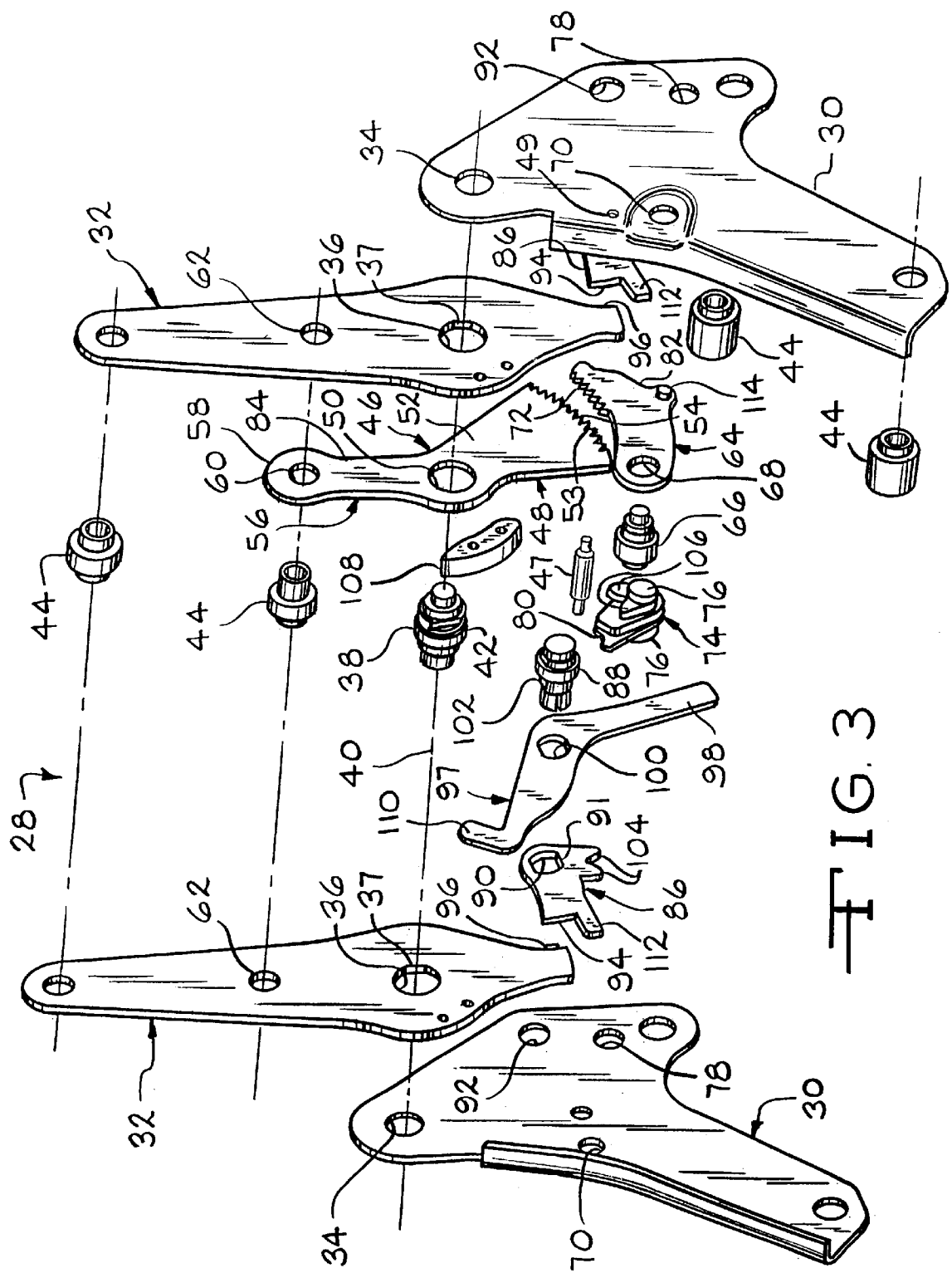

VEHICLE SEAT WITH A YIELDING RECLINER STOP

BACKGROUND OF THE INVENTION

The present invention relates to a vehicle seat with a recliner and in particular to a recliner which yields in a controlled manner to absorb energy during a vehicle collision.

Many vehicle seats are equipped with a lap and shoulder belt restraint system mounted directly to the seat. This provides benefits in terms of comfort and convenience as the belt anchor points move with the seat during seat adjustment and thus stay in a fixed position relative to a seat occupant. With a shoulder belt mounted to a vehicle seat back, the seat back will experience greater loading during a front vehicle collision as compared to a seat back without the shoulder belt mounted thereto. As a result for such designs, it is necessary to provide a seat back and seat back recliner which can accommodate the shoulder belt load.

While seats with integral seat belts currently exist, it is desirable to improve such seats by increasing the energy absorption during a vehicle collision to reduce the energy absorbed by the seat occupant.

It is a feature of the present invention to provide a recliner which yields in a controlled manner during a frontal collision to absorb impact energy.

SUMMARY OF THE INVENTION

The invention can broadly be described as a seat assembly having a seat bottom with a seat bottom frame and a seat back extending upwardly from the rear end of the seat bottom and having a seat back frame mounted to the seat bottom frame by a pivot for rotation about a transverse pivot axis. A recliner is operatively associated with the seat bottom and seat back for holding the seat back in a fixed position relative to the seat bottom. The recliner includes a lock-upper attached to the seat back frame and a lock-lower attached to the seat bottom frame. The lock-lower is movable relative to the seat bottom between a lock position in which the lock-lower engages the lock-upper to hold the seat back in a fixed position relative to the seat bottom and a release position in which the lock-lower is disengaged from the lockupper to enable the seat back frame to rotate about the pivot axis. The lock-upper has a yielding zone configured to deform under a predetermined load to absorb energy. As the lock-upper deforms, the seat back rotates about the pivot even though the lock-lower is in the lock position engaging the lock-upper. A stop is provided which engages the seat back frame upon a predetermined deformation of the lock-upper to limit the deformation of the lockupper.

The invention, as shown and described, is in the context of a pawl and sector recliner. The lock-upper is a sector, while the lock-lower is a pawl having teeth which engage teeth on the sector to hold the seat back in place. However, the invention can be incorporated in other types of recliners such as a gear reducing recliner as well as some power recliners.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the vehicle seat of the present invention containing the yielding recliner;

FIG. 2 is a side view of the yielding recliner with the seat back in an upright position and the recliner locked;

FIG. 3 is an exploded perspective view of the recliner of the present invention;

DETAILED DESCRIPTION OF THE PREFERRED EMBODIMENT

Figure 4:
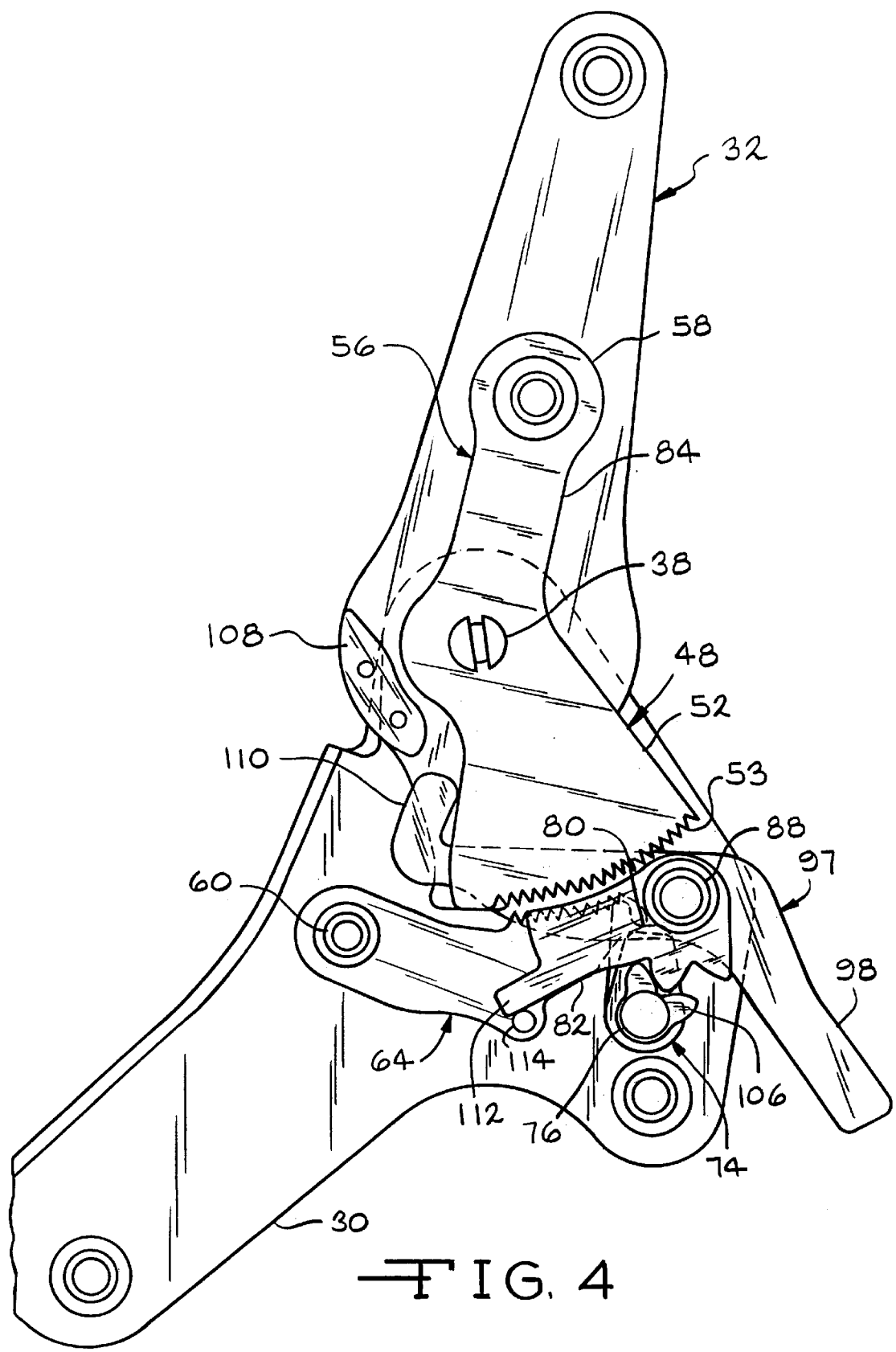
FIG. 4 is a side view of the yielding recliner of the present invention, like FIG. 2, with the recliner in a released position.

With reference to FIG. 1, a seat 10 is shown which includes the yielding recliner of the present invention. The seat 10 includes a generally horizontal seat bottom 12 and a seat back 14 extending upwardly at the rear of the seat bottom 12. A restraint belt 16 is shown along the side of the seat 10. The belt 16 is anchored at its lower end 18 to the seat bottom 12 and extends upwardly to the upper end 20 of the seat back 14. The belt 16 extends into the seat back 14 and is ultimately coupled to a belt retractor in a known manner. A tongue 22 is slidably mounted to the belt 16. The tongue 22 can be inserted into a buckle 24 on the opposite side of the seat 10 from the belt 16. This draws the belt 16 from the retractor and forms a lap belt and a shoulder belt to restrain an occupant seated upon the seat 10.

The angle of the seat back 14 relative to the seat bottom is adjusted by a recliner 28 shown in FIGS. 2–6. The recliner 28 is operated by a handle 26 along the side of the seat bottom 12.

With reference to FIGS. 2–6, the recliner 28 is shown in greater detail. The scat bottom has a frame which includes a pair of mounting plates 30 to which the seat back frame is pivotally attached. The scat back has a frame which includes a pair of support members 32 at the lower end of the seat back frame. The support members 32 are pivotally attached to the mounting plates 30. The mounting plates 30 have pivot apertures 34 which are aligned with pivot apertures 36 in the support members 32. A pivot 38 is disposed within the apertures 34, 36 and defines a pivot axis 40 about which the seat back 14 rotates as the seat back angle is adjusted relative to the seat bottom 12. The seat back support member apertures 36 have one or more flat sides 37 which engage with flat surfaces 42 on the pivot 38 so that the pivot 38 rotates with the seat back 14 relative to the mounting plates 30. The mounting plate apertures 34 are round to enable the pivot 38 to rotate within the apertures 34. The mounting plates 30 are joined together by spacers 44 which maintain the desired space between the two mounting plates 30 for the support members 32 and other components as described. The ends of the spacers 44 are staked to hold the mounting plate 30 together.

The recliner 28 includes a lock-upper 46, shown as a sector 48. The sector 48 is formed by a flat plate disposed between the two seat back support members 32. The sector 48 includes an aperture 50, aligned with the apertures 34, 36, which receives the pivot 38. The sector has a locking portion 52 which extends radially from the pivot 38 and is formed with an arcuate lower edge 53 with an array of teeth 54. The sector 48 further includes a mounting portion 56 which also extends radially from the pivot 38. The distal end 58 of the mounting portion 56 is formed with an aperture 60. The aperture 60 is aligned with the apertures 62 in the support members 32. A spacer 44 extending through the aperture 60 and the apertures 62 joins the sector 48 to the support members 32 to rotate about the pivot axis 40 along with the seat back 14.

The lock-upper 46 is locked to the seat bottom frame mounting plates 30 by a recliner pawl 64. The recliner pawl 64 is rotatably attached to the mounting plates 30 by a pivot 66 extending through the aperture 68 in the pawl 64 and the apertures 70 in the mounting plates 30. The pivot 66 has a pivot axis parallel to the seat back pivot axis 40. The recliner pawl 64 has an arcuate array of teeth 72 which engage the teeth 54 of the sector 48 when the pawl 64 is in a lock position. When the pawl and sector teeth are engaged, the sector 48 is held from rotation about the axis 40, thus holding the seat back 14 in a fixed position relative to the seat bottom 12. The recliner pawl 64 is rotatable to a release position, shown in FIG. 4, disengaged from the sector 48 enabling the seat back to rotate.

A cam 74 is integrally formed with a pivot 76 to mount the cam in the apertures 78 in the mounting plates 30. The cam 74 has a cam surface 80 which engages an edge surface 82 of the pawl 64, opposite the teeth 72. This holds the recliner pawl 64 in the lock position in which the teeth 72 engage the sector teeth 54. The handle 26 is coupled to the cam 74 by a mechanism (not shown) in a known manner to rotate the cam 74 clockwise, as viewed in FIG. 2, out of engagement with the pawl surface 82. This allows the pawl 64 to rotate clockwise, as viewed in FIG. 2, to the release position, out of engagement with the sector teeth 54. Upon release of the handle 26, a spring (not shown) returns the cam 74 back to an engaged position with the pawl 64, moving the pawl 64 to the lock position, thus holding the seat back 14 in a fixed position relative to the seat bottom 12. A pin 47 fixed to the mounting plates 30 at an aperture 49 forms a stop to limit the rearward recline motion of the seat back 14 to a rear most recline position.

The mounting portion 56 of the sector 48 is formed with a yielding zone 84. In the yielding zone, the mounting portion 56 has a reduced cross sectional area. The yielding zone 84 is between pivot aperture 50 and the aperture 60. During a frontal vehicle collision, when the belt 16 is loaded in tension by the occupant load, the yielding zone 84 of the sector yields, i.e. deforms, allowing the distal end 58 to move forward relative to the pivot aperture 50 while the lock portion 52 is held stationary. This allows the seat back 14 to rotate forward about the pivot axis 40, even though the sector 48 is locked in place by the pawl 64. The yielding of the sector absorbs energy to reduce the energy absorbed by the vehicle occupant.

A stop is provided to engage the seat back after a given amount of deformation of the sector 48 to prevent further deformation of the sector 48 and the accompanying rotation of the seat back 14. When the stop is engaged, the stop transmits the load from the seat back to the seat bottom. This reduces the load on the pawl 64 and sector 48 and to prevent failure of the sector 48. The stop includes a pair of stop pawls 86 which are pivotally mounted to the mounting plates 30 by a pivot 88 extending through apertures 90 in the stop pawls and apertures 92 in the mounting plates 30. The stop pawls 86 each have a forward edge contact surface 94 which is aligned with a rear contact surface 96 of the support members 32 when the stop pawls 86 are in stop positions. During normal operation, the contact surfaces 94 of the stop pawls are spaced rearward from the contact surfaces 96 of the support members 32. As the sector yields, the lower ends of the support members 32 move rearward, toward the contact surfaces 94 of the stop pawls 86. When the support members contact the stop pawls, the shoulder belt loading on the seat back is transmitted to the seat bottom frame through the stop pawls 86 rather than through the recliner sector 48 and recliner pawl 64. This stops further forward rotation of the seat back and further yielding of the sector 48.

Figure 5:
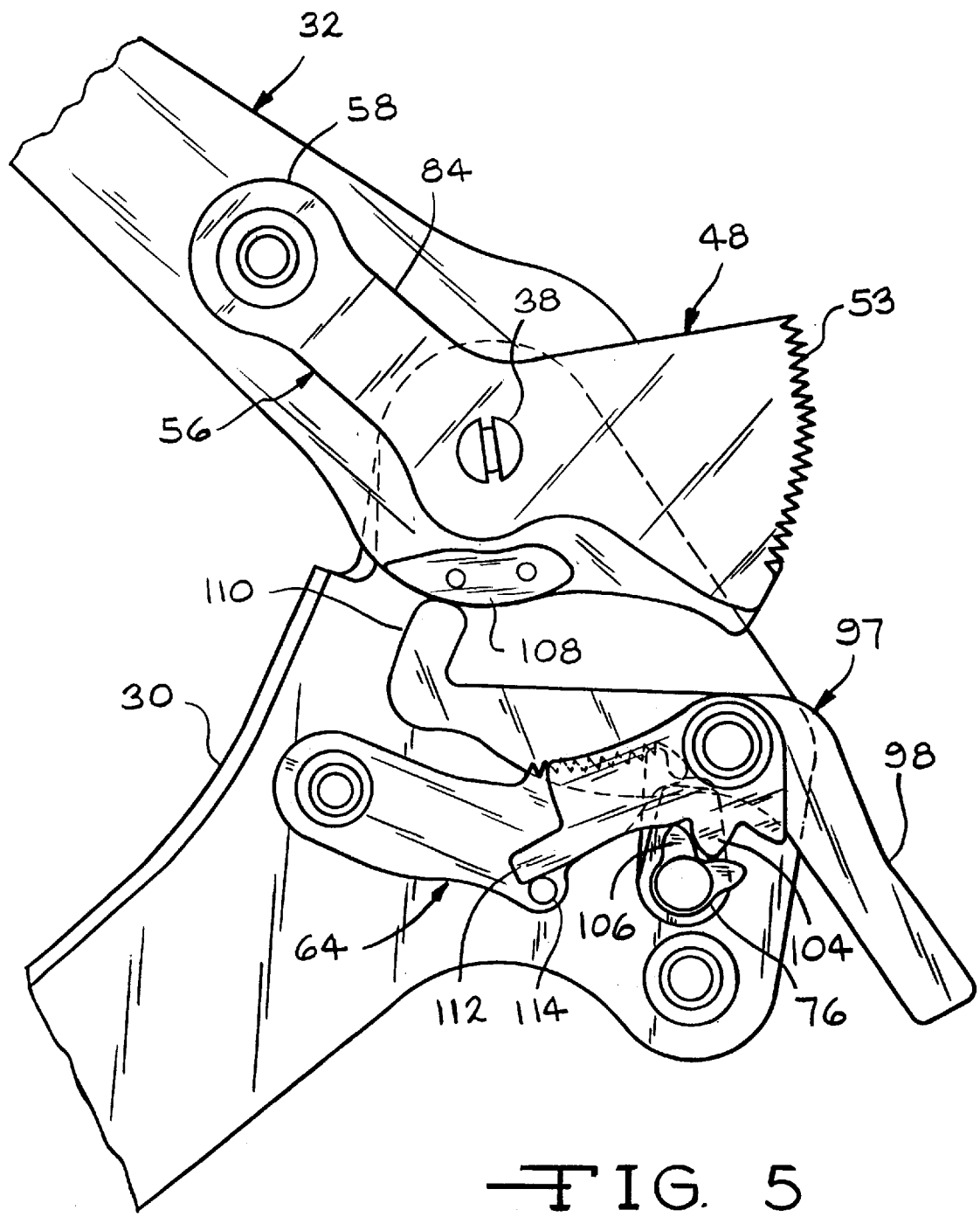
FIG. 5 is a side view of the yielding recliner of the present invention with the seat back in a forward rotated position.
Figure 6:
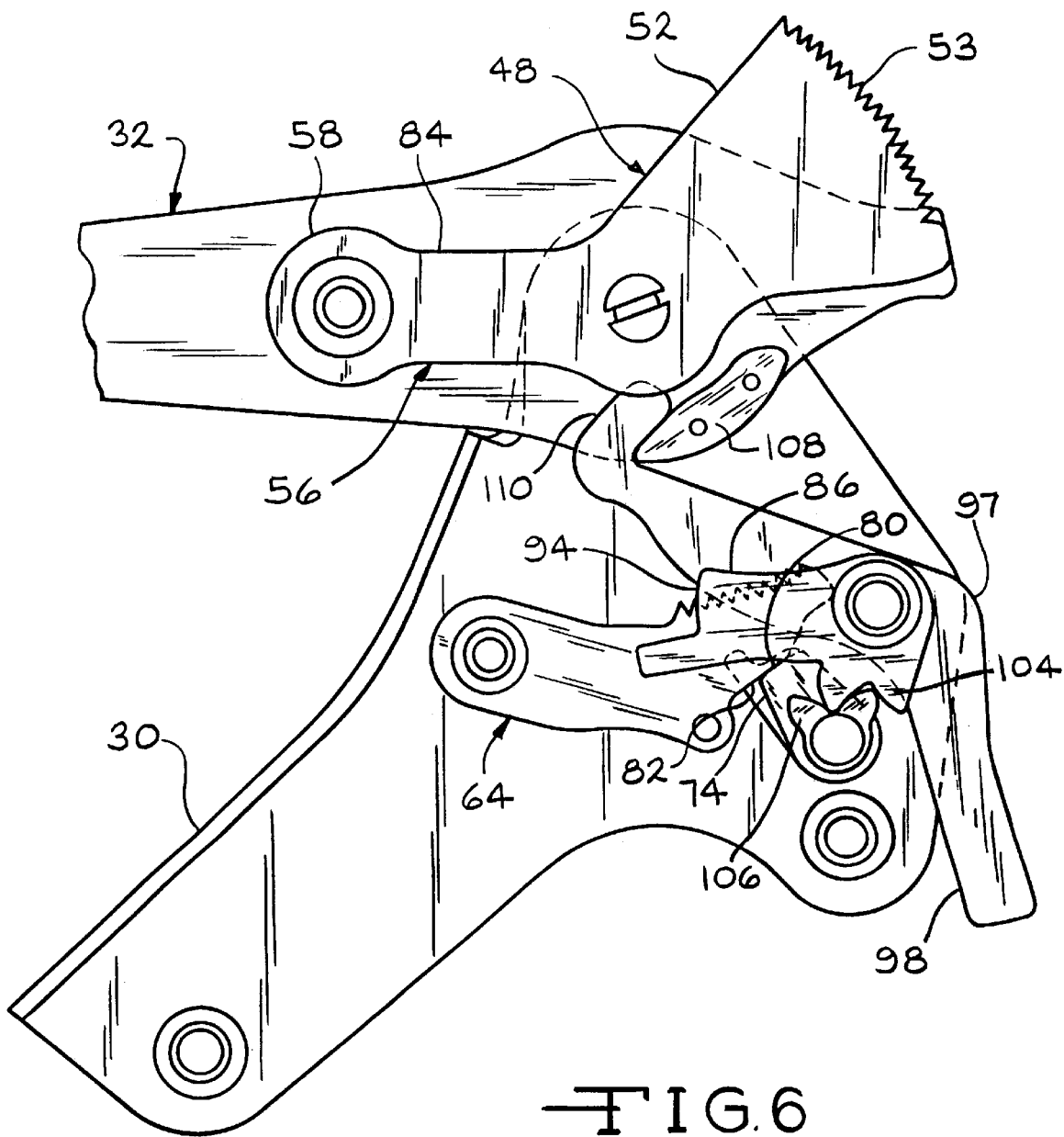
FIG. 6 is a side view of the yielding recliner of the present invention with the seat back in a generally horizontal dump position.

In the recliner mechanism shown in the figures, a seat back dump lever 97 is provided with a handle 98 to release the recliner for rotation of the seat back 14 to a forward dump position to facilitate to ingress and egress from the rear seat. The dump lever 97 has an aperture 100 with a flat side which engages a flat 102 on the pivot 88. When the handle 98 is raised, rotating the lever 97 counterclockwise as viewed in the figures, the pivot 88 rotates. The stop pawls 86 have flats 91 on the apertures 90 whereby rotation of the pivot 88 rotates the stop pawls. As the dump handle 98 is raised, the stop pawls 86 rotate to release positions out of alignment with the lower ends of the support members 32. The stop pawls 86 have a pair of gear teeth 104 which engage gear teeth 106 of the cam 74. Thus, when the dump handle 98 is raised, the stop pawls 86 rotate out of alignment with the support members 32. In addition, the cam 74 moves out of engagement with the pawl 64 allowing the release in the recliner 28. This enables the seat back 14 to rotate forward. A forward rotated position of the seat back 14 is shown in FIG. 5. Likewise, when the release handle 26 on the side of the seat back is actuated to release the recliner, the cam 74 rotates clockwise, thus causing the stop pawls 86 to rotate counterclockwise to their release positions to enable the seat back to rotate forward.

The stop pawls 86 have a forward projecting finger 112. The finger 112 of the pawl 86 shown on the right side of FIG. 3, engages the laterally projecting pin 114 on the recliner pawl 64. When the cam 74 is rotated to the release position and the stop pawls 86 rotate to lowered release positions, the finger 112 contacts the pin 114 and forces the pawl 64 downward, out of engagement with the sector teeth 54. This avoids reliance on gravity alone to disengage the pawl from the sector.

A timing member 108 is mounted between the support members 32 forward of the sector 48. As the seat back rotates forward, the hook shaped end 110 of the lever 97 engages the timing member as shown in FIG. 5. This maintains the lever 97, and thus the stop pawls 86, cam 74 and pawl 64 in their release positions. When the seat back reaches a full forward generally horizontal position shown in FIG. 6, the hook shaped end 110 of the lever 97 clears the front edge of the timing member 108 and returns back to its lock position, catching the lever 97 on the timing member. As a result, the seat back is locked in the horizontal position. The lever 97 must be actuated by rotating counterclockwise, as viewed in the figures, to enable the seat back to be returned to its upright position.

The recliner of the present invention, by yielding in a controlled fashion, is able to absorb energy, thus reducing the energy absorbed by a seat occupant. A stop limits the extent of the yielding by the recliner and thus the degree to which the seat back is able to rotate forward. The stop further limits the maximum load that can be applied to the recliner mechanism whereby failure of the recliner is prevented. The yielding feature of the present invention can be incorporated into recliner types other than the pawl and sector recliner shown in the figures. For example, a yielding zone can be incorporated into the lock-upper of a gear reducing recliner as well as the lock-upper of some power recliners.

The mounting plates 30, the support members 32 rotatably mounted thereto and the recliner 28 form a hinge mechanism for attaching the seat back frame to the seat bottom frame. Providing the recliner lock-upper with a yielding zone to deform in a controlled fashion to allow the seat back to rotate about its pivot axis until the seat back engages a stop, results in the following. During a frontal vehicle collision, with the shoulder belt attached to the seat back, the seat back will rotate about its pivot axis for a predetermined amount. During this rotation, the hinge mechanism, as a system, exhibits a particular deformation versus load ratio. While this may not be a straight line on a graph, an average deformation versus load ratio over this deformation can be determined. Once the stop is engaged with the seat back, any subsequent deformation of the hinge mechanism will occur at a second average deformation versus load ratio which is less than the first average deformation versus load ratio. Initially, a greater deformation occurs to absorb energy until a certain degree of seat back travel has occurred. Afterwards, the deformation or forward rotation of the seat back is reduced after the stop is engaged.

It is to be understood that the invention is not limited to the exact construction illustrated and described above, but that various changes and modifications may be made without departing from the spirit and scope of the invention as defined in the following claims.

What is claimed is:

1. A vehicle seat assembly comprising:
   a seat bottom having a seat bottom frame;
   a seat back extending upwardly from a rear end of said seat bottom, said seat back having a seat back frame mounted to said seat bottom frame by a pivot for rotation;
   a recliner operatively associated with said scat bottom and said seat back for holding said seat back in a fixed position relative to said seat bottom within a range of adjusted positions between a foremost recline position and a rearmost recline position, said recliner having a lock-upper member attached to said seat back frame and a lock-lower member attached to said seat bottom frame, said lock-lower being movable relative to said scat bottom between a lock position in which said lock-lower engages said lock-upper to engage said recliner to hold said scat back frame in said fixed position within said range of adjusted positions and a release position in which said lock-lower is disengaged from said lock-upper to release said recliner whereby said seat back frame is free to rotate;
   said lock-upper having a yielding zone configured to deform under a predetermined load to absorb energy as said scat back frame rotates while said recliner is engaged; and
   a stop carried by said seat bottom frame and engagable with said seat back frame upon a predetermined deformation of said lock-upper to transmit loads from said seat back frame to said seat back bottom.

2. The vehicle seat assembly as defined in claim 1 further comprising a restraint belt webbing mounted to said seat back to form a shoulder belt for a seat occupant.

3. The vehicle seat assembly as defined in claim 2 wherein said stop is operable to limit forward rotation of said seat back.

4. The vehicle seat assembly as defined in claim 1 wherein said scat back is rotatable to a forward dump position beyond said foremost recline position when said recliner is released and wherein said stop is engagable with said seat back frame when said recliner is engaged prior to rotation of said seat back frame to said forward dump position.

5. The vehicle seat assembly as defined in claim 1. wherein said lock-upper is a plate mounted to said pivot to rotate with said seat back, said plate having a locking portion extending in one direction radially from said pivot to engage said lock-lower and said plate having a mounting portion extending in a second direction radially from said pivot and being attached to said seat back frame, said yielding zone being a part of said mounting portion.

6. The vehicle seat assembly as defined in claim 5 wherein said yielding zone is formed by a reduced cross sectional area in said mounting portion of said lock-upper.

7. The vehicle seat assembly as defined in claim 1 wherein said recliner is a pawl and sector recliner in which said lock-upper is a sector and said lock-lower is a recliner pawl.

8. The vehicle seat assembly as defined in claim 7 wherein said lock-upper is a plate mounted to said pivot to rotate with said seat back, said plate having a locking portion extending in one direction radially from said pivot to engage said lock-lower and said plate having a mounting portion extending in a second direction radially from said pivot and being attached to said seat back frame, said yielding zone being a part of said mounting portion.

9. The vehicle seat assembly as defined in claim 8 wherein said yielding zone is formed by a reduced cross sectional area in said mounting portion.

10. The vehicle seat assembly as defined in claim 1 wherein said stop is a stop pawl engagable with a lower end of said seat back frame to limit forward rotation of said seat back frame.

11. The vehicle seat assembly as defined in claim 10 wherein said stop pawl is movably mounted to said seat bottom frame to move to a release position in which said seat back is rotatable to a forward dump position beyond said foremost recline position without engaging said stop pawl.

12. The vehicle seat assembly as defined in claim 11 further comprising a cam to hold said recliner pawl in said lock position, said cam being coupled to said stop pawl to move to a cam release position simultaneously with said stop pawl as said stop pawl moves to said stop pawl release position.

13. The vehicle seat assembly as defined in claim 12 wherein said stop pawl is coupled to said cam by gear teeth on said stop pawl and said cam.

14. A vehicle seat assembly comprising:
    a seat bottom having a seat bottom frame;
    a seat back extending upwardly from a rear end of said seat bottom, said seat back having a seat back frame mounted to said seat bottom frame by a pivot for rotation;
    a restraint belt webbing mounted to said seat back to form a shoulder belt for a seat occupant;
    a pawl and sector recliner operatively associated with said seat bottom and said seat back for holding said seat back in a fixed position relative to said seat bottom within a range of adjusted positions between a foremost recline position and a rearmost recline position, said recliner having a sector attached to said seat back frame and a recliner pawl attached to said seat bottom frame, said recliner pawl being movable relative to said seat bottom between a lock position in which said recliner pawl engages said sector and a release position in which said recliner pawl is disengaged from said sector, said sector and said recliner pawl having engaging locking features to engage said recliner to hold said seat back frame in said fixed position when said recliner pawl is in said lock position and said recliner being released and seat back being free to rotate when said recliner pawl is in said release position;

said sector having a yielding zone configured to deform under a predetermined load applied to said seat back to absorb energy as said back frame rotates while said recliner is engaged; and a stop engagable with said seat back frame upon a predetermined deformation of said sector and rotation of said back frame to transmit loads from the seat back frame to the seat bottom frame.

15. The vehicle seat assembly as defined in claim 14 wherein said stop is a stop pawl mounted to said seat bottom frame by a stop pawl pivot for rotation about a stop pawl pivot axis, said stop pawl being engagable with a lower end of said seat back frame in a stop position to limit forward rotation of said seat back frame prior to said seat back reaching said forward dump position when said recliner is engaged, and said stop pawl being selectively rotatable to a release position when said recliner is engaged to enable said seat back to rotate without engaging said stop pawl.

16. The vehicle seat assembly as defined in claim 15 further comprising a cam mounted to said seat bottom frame for rotation between lock and release positions, said cam in said lock position engaging said recliner pawl to hold said recliner pawl in said recliner pawl lock position and said cam in said release position being disengaged from said recliner pawl to enable said recliner pawl to rotate to said recliner pawl release position, said cam being coupled to said stop pawl to move to said cam release position simultaneously with said stop pawl as said stop pawl moves to said stop pawl release position.

17. The vehicle seat assembly as defined in claim 16 wherein said stop pawl is coupled to said cam by gear teeth on said stop pawl and said cam.

18. The vehicle seat assembly as defined in claim 16 wherein said stop pawl is coupled to said stop pawl pivot to rotate with said stop pawl pivot about said stop pawl pivot axis and further comprising a seat back dump handle operable to release said recliner to enable said seat back to rotate to said forward dump position, said dump handle being coupled to said stop pawl pivot to rotate said stop pawl pivot and said stop pawl to said release position whereby said cam is rotated to said cam release position to release said recliner to enable forward rotation of said seat back without engagement of said seat back frame with said stop pawl.

19. The vehicle seat assembly as defined in claim 15 further comprising a pair of said stop pawls both mounted to said stop pawl pivot for rotation about said stop pawl pivot axis.

20. The vehicle seat assembly as defined in claim 15 wherein said seat back frame includes a pair of support members at said lower end of said seat back frame which engage said stop pawl to limit forward rotation of said seat back.

21. A vehicle seat assembly comprising:

a seat bottom having a seat bottom frame;

a seat back having a seat back frame and extending upwardly from a rear end of said seat bottom;

a hinge mechanism mounting said seat back frame to said seat bottom frame for rotation, said hinge mechanism including a recliner to hold said seat back in a fixed position relative to said seat bottom within a range of adjusted positions between a foremost recline position and a rearmost recline position; and a restraint belt webbing mounted to said seat back frame to form a shoulder belt for a seat occupant such that a frontal vehicle impact produces a torsional load on said hinge mechanism;

said hinge mechanism deforming under said torsional load at a first average deformation versus load ratio for a predetermined amount of deformation and subsequently deforming at a second average deformation versus load ratio which is less than said first average deformation versus load ratio.

22. The vehicle seat assembly as defined in claim 21 wherein said recliner includes a lock-upper fixed to said seat back frame having a yielding zone which deforms during said predetermined amount of deformation.

23. The vehicle seat assembly as defined in claim 22 wherein said hinge mechanism includes a stop engaged by said seat back frame after said predetermined amount of deformation which relieves said lock-upper from said torsional load and transfers said torsional load to said stop.

* * * * *

UNITED STATES PATENT AND TRADEMARK OFFICE
CERTIFICATE OF CORRECTION

PATENT NO. : 6,209,955 B1
DATED : April 3, 2001
INVENTOR(S) : Seibold

It is certified that error appears in the above-identified patent and that said Letters Patent is hereby corrected as shown below:

Title page,
Item [54], Title, please delete "VEHICLE SEAT WITH A YIELDING RECLINER STOP" and insert therefor -- VEHICLE SEAT WITH A YIELDING RECLINER AND STOP --.

Column 5,
Lines 33, 41, 43, 50 and 63, please delete the word "scat" and insert therefor -- seat --.

Signed and Sealed this

Second Day of November, 2004

JON W. DUDAS
*Director of the United States Patent and Trademark Office*